Nov. 12, 1957 J. A. DEL FRANCIA ET AL 2,812,706
ELECTRICAL BROILER
Filed May 24, 1954 2 Sheets-Sheet 1

JOEL ALFRED DEL FRANCIA,
RUSSELL M. CARSON,
INVENTORS.

BY
ATTORNEY.

Nov. 12, 1957    J. A. DEL FRANCIA ET AL    2,812,706
ELECTRICAL BROILER
Filed May 24, 1954    2 Sheets-Sheet 2
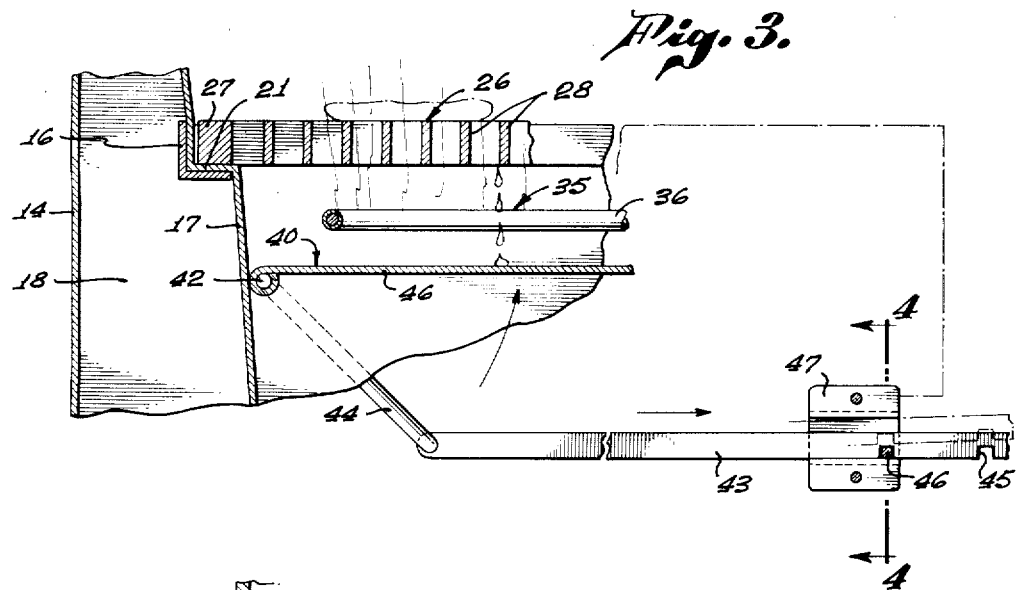
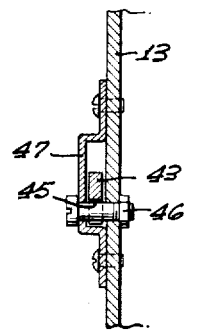
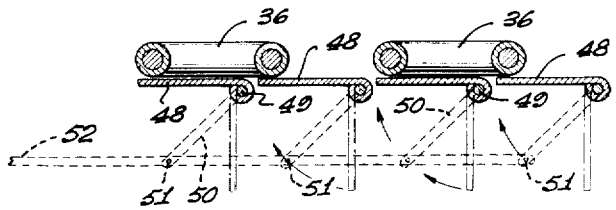
JOEL ALFRED DEL FRANCIA,
RUSSELL M. CARSON,
INVENTOR.
BY *H. Calvin White*
ATTORNEY.

# United States Patent Office 2,812,706
Patented Nov. 12, 1957

2,812,706
ELECTRICAL BROILER

Joel Alfred Del Francia, Alhambra, and Russell M. Carson, San Marino, Calif.

Application May 24, 1954, Serial No. 431,836

9 Claims. (Cl. 99—446)

This invention has to do with improvements in cooking equipment, and with special reference to broilers of the type adaptable for restaurant or home use principally for the cooking of meats on an exposed grid. More particularly, the invention is directed to novel improvements in electrically heated broilers, having for their general object and purpose to increase the desirability for and utility of electrical broilers by imparting to them certain performance and cooking characteristics which are unobtainable in any electrically energized cooking equipment of which we are aware, and the lack of which has been responsible for the limited use of electrical heating in broiler type cooking equipment.

Speaking first with reference to their general structures, meat broilers of the present type comprise a housing at or within the top of which is positioned a horizontally extending cooking grid to be made in one or more sections, any one or more of which may have the special feature of tiltability as more particularly dealt with in the Joel A. Del Francia application Serial No. 321,705, filed November 20, 1952, on "Broiler," which issued as Patent No. 2,720,827. Below the grid the housing contains a fire box which in a large majority of instances is adapted for the accommodation of a flame producing heating means, such, for example, as charcoal or an open flame gas heater. It is considered generally desirable, both from standpoints of the visual aspects of meat cooking as well as the quality of the cooking itself, to subject the meat to direct or proximate flame contact at least during some stage of the cooking period. And accordingly, the conventional broilers have been designed to use fuels or heating means such as will produce a flame beneath the grid.

Now for various reasons and particularly for certain types of installations, electrical heating may be advantageous or particularly desirable. However, as indicated, there has been little demand for electrically heated broilers because of the fact that while an electrically energized or radiant heating element may supply the necessary heat and may glow when brought up to temperature, still the element does not produce a flame which has been considered a necessary if not indispensable requirement for broilers of this type.

The present invention has for its general object to adapt electrically heated broilers for the creation of flame near or in direct proximity to the grid, all in a manner such that under control of the operator, the meat may be exposed to both the normal radiant heating from an electrically energized element, and also a flame created by the heat developed at the element. More specifically, the invention contemplates the provision of means whereby grease drippings from the meat are intercepted and retained in such proximity to the heating element as to cause the grease to be heated to its flash temperature and thereby caused to flame upwardly against the grid. As will appear, in accomplishing these objects, we provide a flame creating means controllable by the operator to the extent of variably intercepting the grease drippings at different locations in relation to the heating element, and capable also of being displaced to an inoperative condition enabling the element to function in a normal manner where the presence of flame is not desired.

In its more specific structural aspects, the invention aims to provide within the broiler housing, movable grease intercepting means displaceable from an inoperative position remote from an open formation electrical heating element, upwardly to positions of variable proximity in relation thereto, all in a manner such that the flame-creating means is caused to present an extended surface area directly below the element and onto which grease drippings collect after passing through the element. By bringing the grease collecting surfaces in rather close proximity to the element, heat radiated from the latter ignites the grease, creating a flame that rises against the meat being cooked on the grid. Thus the invention accomplishes the combined effects and advantages of flame creation which lends attractiveness to the performance of the apparatus as a broiler, and which subjects the meat on the grid to direct flame as well as radiant heat temperatures.

The aforementioned features and objects of the invention, as well as additional aspects together with the details of a typical and illustrative embodiment, will be understood more fully from the following description of the accompanying drawings, in which:

Fig. 3 is a fragmentary section taken on line 3—3 of Fig. 2;

Fig. 4 is an enlarged cross-section on line 4—4 of Fig. 3; and

Fig. 5 is a view illustrating a variational embodiment of the invention.

Figure 1:
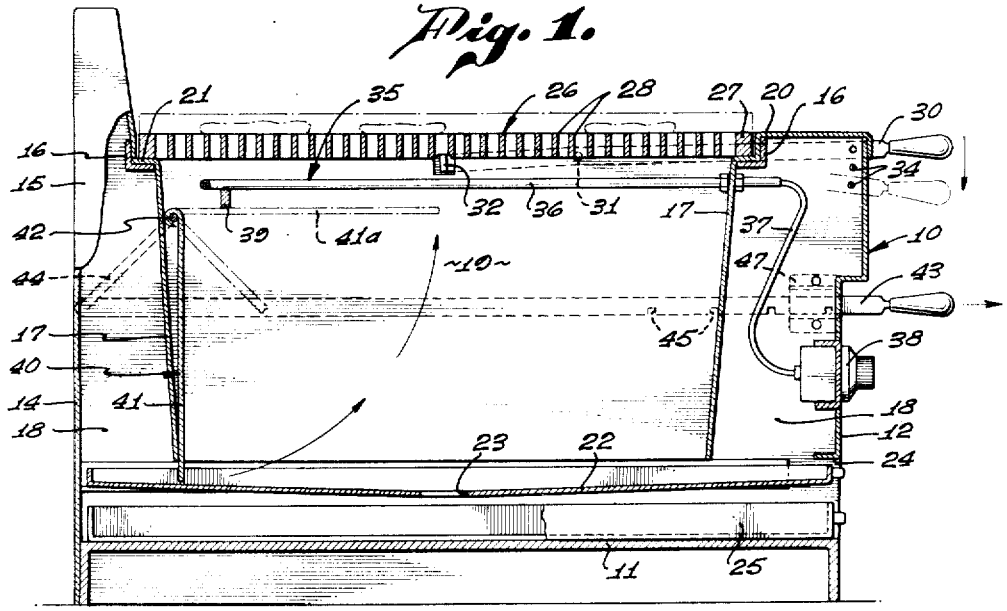
Fig. 1 is a view showing the broiler in vertical cross-section and indicating the variable position range of the grease retaining baffle.
Figure 2:
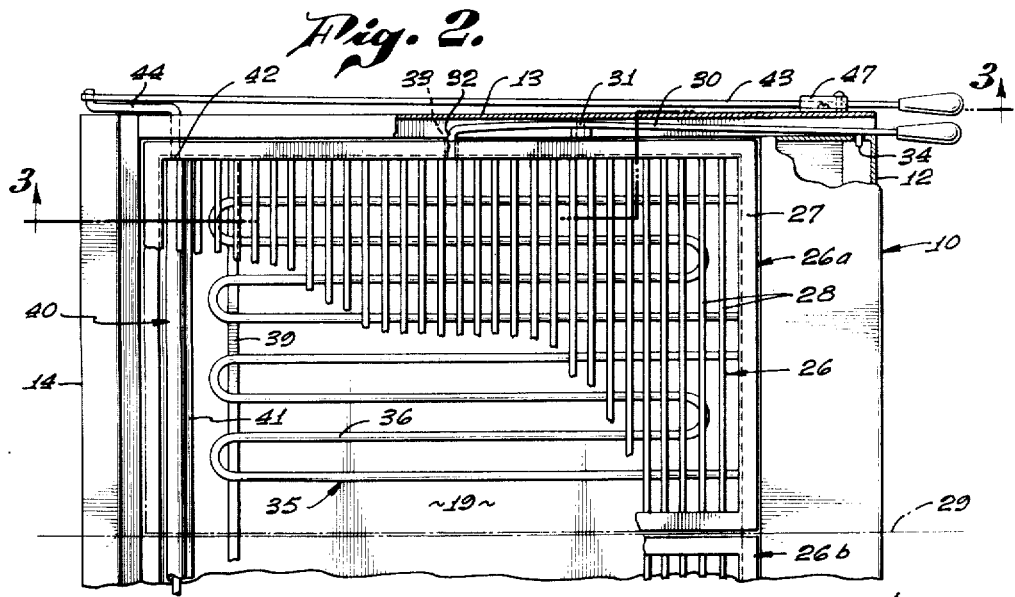
Fig. 2 is a fragmentary plan view of Fig. 1.

Referring first to the general showings of Figs. 1 and 2, the apparatus comprises an outer housing structure, generally indicated at 10, which includes the base 11, side walls 12, 13, 14 and 15 forming an open top essentially box-like structure. Angle frame pieces 16 within the upper interior of the housing support an inner shell 17 spaced at 18 from the outer housing and defining therein a chamber 19. The inner shell 17 may be supported in any suitable manner by the frame member 16, as by extending the forward top side of the shell at 20 over the frame and the top of the housing 10 to the outside, the opposite wall of the shell being turned to overlay the angle frame as at 21. The bottom open end of chamber 19 overlies a drip tray 22 having a central opening 23 and supported within the housing for removal through its opening 24. A pan 25 which collects grease dropping from the inclined tray 22, is supported on the base 11 for removal through opening 24.

The cooking grid, generally indicated at 26, is supported at or within the upper interior of the housing and in direct overlying relation to the chamber 19. Generally considered, the grid may be of any suitable form and construction, and is shown typically as being made in two sections 26a and 26b, each of which comprises a rectangular frame 27 removably supported on the top shouldered extents of the inner shell 17, and containing uniformly spaced parallel grid bars 28. While the feature of grid adjustability is not essential to the primary objects of the invention, rendering the grid adjustable in relation to the later described heating element presents advantages in enabling the grid position to be varied in relation to the heat source, i. e. the radiant heating element and the flame created therebelow. Accordingly, in referring to what may be regarded as a preferred embodiment, the grid sections individually are tiltable toward the center line 29 of the broiler, i. e. at the adjacent edges of the grids 26a and 26b, by handle levers 30 each of which is pivotally fulcrumed at an intermediate location 31 and has a turned end 32 received within the opening 33 in the grid frame. By operation of the lever 30, the grid may be tilted from the horizontal to any of different positions of angularity as defined by stops variably insertable within the housing frame openings 34.

The heating element, generally indicated at 35 is electrically energized and may have any suitable specific form appropriate for electrical radiant heating, so long as the element is of essentially open formation and will permit the passage of grease drippings from the grid down through the chamber 19 or onto the later described flame creating means. Merely as illustrative, the heater 35 is shown to comprise a multiple course return bend element 36 positioned horizontally directly below the grid 26 and receiving current through conductor 37 under control of a rheostat switch 38 positioned in the front panel of the housing. The opposite side of the element is supported within the chamber 19, as upon member 39.

In an illustrative and practicably simple form, the grease arresting and flame creating means generally indicated at 40, is shown to comprise a plate or baffle 41 pivotally mounted at 42 within the one side of the chamber 19 for vertical swinging movement between the solid and broken line position shown in Fig. 1. The baffle may be suitably actuated, as by a longitudinally shiftable handle lever 43 having a pivoted length connection 44 with the baffle. By providing lever 43 with spaced notches 45 which receive a stationary shoulder or projection 46 within lever-passing bracket 47, see Fig. 3, the baffle 41 may be held in any of several selected position intervals between the horizontal position 41a and the fully retracted solid line position appearing in Fig. 1.

Fig. 5 illustrates a variational form of the invention in which the grease arresting baffle 41 is replaced by a series of individual relatively narrow baffles 48 carried by pivot rods 49 directly beneath the element 36. It will be understood that the series of baffles 48 may extend beneath the entirety or any lesser portion of the heating element and grid area. Provision may be made for shifting the baffles 48 simultaneously between the solid line and vertical broken line positions, as by arms 50 connected to the pivots 49 and connected at 51 to a common actuating lever 52.

In considering the use and operation of the broiler, at such time as no flame effect or cooking on the grid by direct contact with burning grease flame, as distinguished from the radiant heat of the element 35, the baffle 41 may be maintained in the swung-down or retracted position of Fig. 1. To create the maximum flame through and above the grid, the baffle is swung upwardly to the broken line position 41a, at which the baffle intercepts grease drippings falling from the grid through the element throughout the projected grid area occupied by the baffle. The grease-collecting surface of the baffle thus is brought into such proximity to the element 35 that the grease is heated to its flash temperature and thus ignited to burn in a flame rising up through the element and grid. At such times as it may be desired to produce a less intense flame, or to drop the flame location downwardly within the chamber 19, the baffle 41 may be inclined to produce the dual effects of lowered elevation and flame reduction due to some run-off of the grease.

It will be understood from the foregoing, how similar effects may be obtained by adjustment of the baffles 48 between illustrated solid and broken line positions, all as illustrated in Fig. 5.

In final reference to the pan 22, it may be observed that the latter serves in addition to its grease collecting purpose, the further function of presenting a heat reflective surface from which heat radiated downwardly from the element 36, is reflected back upwardly through the grid and against the food being cooked, all to the end of increasing the thermal efficiency of the unit. However, the pan 22 will be maintained sufficiently far below the element as to avoid heating any grease on the surface of the pan to a flash temperature.

The drawings are to be regarded merely as illustrative of the invention in certain typical embodiments, and it will be understood that various changes and modifications may be made without departure from the invention in its intended spirit and scope.

We claim:

1. An electrical broiler comprising a housing, a horizontally extending grid overlying the upper interior of the housing, said grid including spaced cross members adapted to pass grease drippings downwardly therethrough from an edible supported thereon, an electrically energized heating element directly underlying the grid and having open formation to pass said grease dropping from the grid and for passing flames upwardly therethrough to said grid, said element being openly exposed to and unprotected from contact by said dropping grease, and flame creating means including a grease collector presenting an extended grease receiving surface area from which flames are adapted to rise, said means extending in such underlying proximity to said element and said grid that heat from said element will ignite grease deposited on said surface area and said flames will rise to said grid.

2. An electrical broiler comprising a housing, a horizontally extending grid overlying the upper interior of the housing, said grid including spaced cross members adapted to pass grease drippings downwardly therethrough from an edible supported thereon, an electrically energized heating element directly underlying the grid and having open formation to pass said grease dropping from the grid and for passing flames upwardly therethrough to said grid, said element being openly exposed to and unprotected from contact by said dropping grease, flame creating means including a grease collector presenting an extended grease receiving surface are from which flames are adapted to rise, and a support mounting said means for movement into and out of such underlying proximity to said element and said grid that heat from said element will ignite grease deposited on said surface area and said flames will rise to said grid, and a movable actuating means connected to said flame creating means.

3. An electrical broiler comprising a housing, a horizontally extending grid overlying the upper interior of the housing, said grid including spaced cross members adapted to pass grease drippings downwardly therethrough from an edible supported thereon, an electrically energized heating element directly underlying the grid and having open formation to pass said grease dropping from the grid and for passing flames upwardly therethrough to said grid, said element being openly exposed to and unprotected from contact by said dropping grease, flame creating means including a grease collector presenting an extended grease receiving surface area from which flames are adapted to rise, a support mounting said means for movement into and out of such underlying proximity to said element and said grid that heat from said element will ignite grease deposited on said surface area and said flames will rise to said grid, a movable actuating means connected to said flame creating means, and means engagable with said movable actuating means for maintaining said surface area in positions of varying proximity to said heating element.

4. An electrical broiler comprising a housing, a horizontally extending grid overlying the upper interior of the housing, said grid including spaced cross members adapted to pass grease drippings downwardly therethrough from an edible supported thereon, an electrically energized heating element directly underlying the grid and having open formation to pass said grease dropping from the grid and for passing flames upwardly therethrough to said grid, said element being openly exposed to and unprotected from contact by said dropping grease, flame creating means including a grease collector presenting an extended grease receiving surface area from which flames are adapted to rise, and a support mounting said means in such underlying proximity to said element and said grid that heat from said element will ignite grease deposited on said surface area and said flames will rise to said grid.

5. An electrical broiler comprising a housing, a horizontally extending grid overlying the upper interior of the housing, said grid including spaced cross members adapted to pass grease drippings downwardly therethrough from an edible supported thereon, an electrically energized heating element directly underlying the grid and having open formation to pass said grease dropping from the grid and for passing flames upwardly therethrough to said grid, said element being openly exposed to and unprotected from contact by said dropping grease, flame creating means including a grease collector presenting an extended grease receiving surface area from which flames are adapted to rise, a support mounting said means for movement into and out of such underlying proximity to said element and said grid that heat from said element will ignite grease deposited on said surface area and said flames will rise to said grid, and means including a seat carried by said housing supporting a portion of said grid and mounting it for pivotal movement and a lever connected to a second portion of said grid for tilting said grid upwardly from the heating element.

6. An electrical broiler comprising a housing, a horizontally extending grid overlying the upper interior of the housing, said grid including spaced cross members adapted to pass grease drippings downwardly therethrough from an edible supported thereon, an electrically energized heating element directly underlying the grid and having open formation to pass said grease dropping from the grid and for passing flames upwardly therethrough to said grid, said element being openly exposed to and unprotected from contact by said dropping grease, flame creating means including a grease collector presenting an extended grease receiving surface area from which flames are adapted to rise, and a support mounting said means for movement into and out of such underlying proximity to said element and said grid that heat from said element will ignite grease deposited on said surface area and said flames will rise to said grid, said flame creating means occupying a portion of the projected area of the heating element.

7. An electrical broiler comprising an outer housing, an inner shell defining a chamber within and spaced from the housing, a grease collecting pan at the bottom of said chamber, a horizontally extending grid overlying the upper portion of said chamber, said grid including spaced cross members adapted to pass grease drippings downwardly therethrough from an edible supported thereon, an electrically energized heating element directly underlying the grid and having open formation to pass said grease dropping from the grid and for passing flames upwardly therethrough to said grid, said element being openly exposed to and unprotected from contact by said dropping grease, flame creating means in said chamber including a plurality of grease collectors presenting an extended surface area from which flames are adapted to rise, supports mounting said collectors for movement into and out of such underlying proximity to said element and said grid that heat from said element will ignite grease deposited on said surface area and said flames will rise to said grid, and a movable actuating means connected to said flame creating means at a location within the chamber and extending to the outside of said housing.

8. An electrical broiler comprising an outer housing, an inner shell defining a chamber within and spaced from the housing, a grease collecting pan at the bottom of said chamber, a horizontally extending grid overlying the upper portion of said chamber, said grid including spaced cross members adapted to pass grease drippings downwardly therethrough from an edible supported thereon, an electrically energized heating element directly underlying the grid and having open formation to pass said grease dropping from the grid and for passing flames upwardly therethrough to said grid, flame creating means in said chamber presenting an extended surface area from which flames are adapted to rise, and a support mounting said means for movement into and out of such underlying proximity to said element and said grid that the heat from said element will ignite grease deposited on said surface area and said flames will rise to said grid, said flame creating means comprising a grease collecting plate mounted for vertical swinging movement at one side of the grid.

9. Apparatus as defined in claim 8 in which said plate is movable to a substantially horizontal position occupying a portion only of the projected area of said element.

References Cited in the file of this patent

UNITED STATES PATENTS

| 1,717,269 | Shroyer | June 11, 1929 |
| 1,745,340 | Parker | Jan. 28, 1930 |
| 2,290,658 | Volks | July 21, 1942 |
| 2,362,415 | Sivley | Nov. 7, 1944 |
| 2,422,450 | Van Daam | June 17, 1947 |

FOREIGN PATENTS

| 13,172 | Great Britain | May 28, 1897 |

UNITED STATES PATENT OFFICE
Certificate

Patent No. 2,812,706

Patented November 12, 1957

Joel Alfred Del Francia and Russell M. Carson

The United States District Court for the Southern District of California, Central Division, having, pursuant to Title 35, Section 256 of the United States Code, and on notice and hearing of all parties concerned, ordered that the above identified United States patent be corrected by deleting the name of Russell M. Carson as a joint inventor in the patent, it is this 12th day of May 1959, certified that the name of said Russell M. Carson is hereby deleted from the patent as a joint inventor with Joel Alfred Del Francia.

[SEAL]

ARTHUR W. CROCKER,
*First Assistant Commissioner of Patents.*